United States Patent [19]
Koefod

[11] Patent Number: 6,156,227
[45] Date of Patent: Dec. 5, 2000

[54] DEICER COMPOSITION WHICH INCLUDES A PLANT MATERIAL WHICH IS A CORROSION INHIBITOR

[75] Inventor: Robert S. Koefod, Plymouth, Minn.

[73] Assignee: Cargill, Incorporated, Wayzata, Minn.

[21] Appl. No.: 09/259,854

[22] Filed: Mar. 1, 1999

[51] Int. Cl.[7] ....................................................... C09K 3/18
[52] U.S. Cl. .............................................. 252/70; 106/13
[58] Field of Search ................................... 252/70; 106/13

[56] References Cited

U.S. PATENT DOCUMENTS

| | | | |
|---|---|---|---|
| 4,430,240 | 2/1984 | Sandvig et al. | 252/70 |
| 4,664,832 | 5/1987 | Sandvig et al. | 252/70 |
| 4,676,918 | 6/1987 | Toth et al. | 252/70 |
| 5,635,101 | 6/1997 | Janke et al. | 252/70 |
| 5,709,813 | 1/1998 | Janke et al. | 252/70 |
| 5,849,356 | 12/1998 | Gambino et al. | 252/70 |
| 5,922,240 | 7/1999 | Johnson et al. | 252/70 |
| 5,965,058 | 10/1999 | Janke et al. | 252/70 |

OTHER PUBLICATIONS

"Peptide Interactions with Steel Surfaces: Inhibition of Corrosion and Calcium Carbonate Precipitation" by E. Mueller, C.S. Sikes, and B.J. Little, *Corrosion*, vol. 49, No. 10 (Oct. 1993), pp. 829–835.

"Studies on Plant Extracts as Corrosion Inhibitors for Mild Steel in Air Saturated Water", Daud, Mohamad; Daud, Abdul Razak; Sidi, Zainal Abidin, Document No. 110:143454 (1989). (no month).

"Preparation and Anticorrosion Properties of Some Derivatives of Hydrolysis Lignin", Abduazimov, Kh. A.; Saipov, Z. K.; Kurbanov, F. K.; Allabergenov, K., Document No. 86:74699 (1977). (no month).

"Kelp Meal as Suspending Agent for Liquid Fertilizers", Stauter, Earl L., Document No. 73:130316 (Sep. 1970).

"Oil–Soluble Corrorion Inhibiting Agents", Ajinomoto Co., Document No. 95:100357 (Apr. 1981).

"Inhibition Effectiveness of Constituents of Wheat Protein on Corrosion", Kajita, Tsutomu, Document No. 119:278271 (1993). (no month).

"Corrosion Inhibitors for Steel–Reinforced Concrete", Tsuyuki, Hisamitsu, Uchida, Kiyohiko; Inokawa, Takashi; Sakakibara, Hiroyuki; Ozawa, Satoshi, Document No. 116:261247 (Jan. 1992).

"Metal Corrosion Inhibitor", Popelyukh, G.M.; Talavira, L.I.; Gazha, P.A.; Burtnenko, L.M.; Fedorenko, V.D.; Adrianov, A.M.; Ivanov, E.S., Document No. 102:136429 (Dec. 1984).

"Inhibitory Effect of Some Proteins on the Corrosion of Mild Steel", Kajima, Tsutomu, Document No. 87:121202 (1977). (no month).

*Primary Examiner*—Anthony Green
*Attorney, Agent, or Firm*—Fitch, Even, Tabin & Flannery

[57] ABSTRACT

This invention is directed to a particulate deicing composition comprising a particulate deicer salt such as sodium chloride; and a particulate plant material having a particle size of from about $2000\mu$ or less and a moisture content of from about 12 percent or less. The particulate deicer salt and the particulate plant material are in relative amounts so that the particulate plant material is effective for inhibiting the corrosivity of the deicer salt on ferrous metal.

28 Claims, No Drawings

DEICER COMPOSITION WHICH INCLUDES A PLANT MATERIAL WHICH IS A CORROSION INHIBITOR

FIELD OF THE INVENTION

The invention is directed to a solid particulate deicer composition which utilizes the strong deicing ability of alkali metal deicer salts such as sodium chloride or an alkaline metal salt such as calcium chloride, but which also reduces or even minimizes the harsh corrosive effect of such deicer salt on ferrous metals, makes the deicer salt more environmentally friendly, yet also provides a composition which includes a corrosion inhibitor which is naturally renewable, inexpensive and is environmentally friendly. More particularly, the solid particulate deicing composition of the invention comprises a solid, particulate deicer salt such as sodium chloride, magnesium chloride, calcium chloride and/or potassium chloride and particulate plant material which is relatively dry and which mitigates the corrosive effect of the deicer salt (especially sodium chloride) on ferrous metal. The particulate material blend of deicer salt and plant material may be spread by existing commercial equipment used for applying solid particulate deicing salts such as sodium chloride, magnesium chloride, calcium chloride and/or potassium chloride.

BACKGROUND OF THE INVENTION

Calcium chloride and alkali metal salts, such as sodium chloride, are extensively used in very large quantities on the roads of many countries for snow and ice removal. The use of calcium chloride or sodium chloride has, however, met with some resistance due to their corrosive effect on ferrous metal and deleterious effect on concrete. Aqueous solutions of NaCl are known to oxidatively corrode ferrous metal and cause scaling or surface damage to concrete. Indeed, data has been released suggesting that the cost of the damage associated with the widespread application of salt is approximately fourteen times the direct cost associated with the application of the salt; D. M. Murray, et al., *An economic Analysis of the Environmental Impact of Highway Deicing*, U.S. Environmental Protection Agency, Cincinnati, Ohio, EPA-600/A-76-105 (May 1976). Accordingly, it would be highly desirable to provide a deicing composition which deices rapidly, has a reduced level of concrete damage, and reduces corrosion of ferrous metallic objects.

Various additives have been proposed for mixing with salt to aid in inhibiting corrosion caused by the salt. British Patent No. 1328509 to Bishop et al. describes a composition suitable for use in the inhibition of corrosion caused by salt, which includes a water-soluble polyphosphate and a surface active agent. The surface active agent is various amine compounds. In an article by E. E. Steed, *Road Research Laboratory*, Ministry of Transport, Report LR268-1969, polymetaphosphate inhibitors which require the presence of calcium ions are described to be effective as a corrosion inhibitor for brine solutions.

There is a serious need to provide a low cost deicing composition which reduces corrosion, such as oxidative corrosion caused by aqueous solutions of deicer salts, but which deicers are more environmentally friendly and have naturally renewable ingredients. Depending on cost, a deicing composition which reduces such corrosion or rust would be highly desirable for use on roadways where large quantities of the deicing composition are required. The present invention is directed to providing a solid deicing composition which is suitable for highway and sidewalk use, which resists corrosion of ferrous metal and which is made from naturally abundant ingredients which are renewable.

SUMMARY OF THE INVENTION

The invention provides a new deicing composition and a method for deicing frozen surfaces because the composition and method inhibit the corrosivity effect of a deicer salt such as sodium chloride, magnesium chloride, calcium chloride and/or potassium chloride during the deicing. The invention provides a dry, solid, particulate deicer salt and corrosion inhibitor composition, but minimizes the harsh corrosive effect of a deicer salt such as sodium chloride on ferrous metals, makes the deicer composition more environmentally friendly, and also provides a corrosion inhibitor which is naturally renewable, inexpensive and also is environmentally friendly. The composition of the invention includes dry ground plant material such as dried ground grain, vegetable and/or fruit plant material and particulate deicer salt selected from the group consisting of sodium chloride, magnesium chloride, calcium chloride, potassium chloride and mixtures thereof. The deicer salt is in an amount effective for deicing roads, sidewalks or other frozen surfaces and the dry ground plant material is in amount effective for reducing the corrosive effects of the particulate sodium chloride on ferrous metal. In most circumstances, the dry, solid, particulate deicing composition comprises at least about 0.5 weight percent dry ground plant material, based upon the weight of the deicing composition, and at least about 50 weight percent particulate deicer salt, based upon the weight of the deicing composition. In general, the deicing composition comprises from about 0.5 to about 50 weight percent dry ground plant material and from about 99 to about 50 weight percent particulate deicer salt. In an important aspect, the deicer composition comprises from about 0.5 to about 20 weight percent dry ground plant material and from about 99 to about 80 weight percent deicer salt.

In an important aspect, the deicer salt is sodium chloride and the dry ground plant material is selected from the group consisting of dried ground alfalfa, wheat, field and/or lawn grass, linseed, malt, barley, milkweed, clover, vetch, plantain, sorghum, soybeans, cannola seeds, carrots, cotton seeds, sunflower seeds, linseed, peanuts, citrus fruits and mixtures thereof.

In a particularly important aspect, the plant material is dried and ground alfalfa. The plant material is ground to a particle size of from about $2000\mu$ (microns) or less and preferably from about $1500\mu$ to about $150\mu$. The plant material also is dried to a moisture content of about 12 weight percent or less.

The dry particulate plant material permits the solid particulate deicing composition which includes the particulate deicing salt to be relatively dry and spreadable by existing commercial equipment used for applying, such as by broadcasting, solid particulate deicing salts, such as sodium chloride, magnesium chloride, potassium chloride and calcium chloride. The particularly surprising aspect of the invention is that after grinding and drying, the plant material not only will have a particle size and moisture level which is effective to permit it to be spread by existing commercial equipment which broadcasts existing deicing salts, but the dry, ground plant material (1) also will inhibit the corrosivity of a deicer salt such as sodium chloride to ferrous metals after it is spread on a frozen surface which requires deicing, and (2) also provide a corrosion inhibition effect with an inexpensive naturally renewable material.

In another important aspect, the deicing composition also includes a hygroscopic salt in an amount which is effective to bind the particulate plant material to a cheaper non-hygroscopic deicer salt such as sodium chloride, and maintain homogeneity of the dry, ground plant material throughout the deicing composition where the homogeneity is sufficient to effect the corrosivity inhibition provided by the ground plant material throughout the composition. While not intending to be bound by any theory, it is believed that the hygroscopic salt will gather or get moisture in an amount effective to bind the dry, ground plant material to the particulate deicing salt. In a particularly important aspect, the hygroscopic agent is a deicer salt such as magnesium chloride or calcium chloride which will have a hydration which will permit it to act as a hygroscopic agent to gather or get moisture, so that the relatively smaller size particles of plant material will not segregate and be separated from the bulk of the deicing salt particles, but the plant material will bind and stick to the larger deicing salt particles and effect substantial homogeneity to the deicing mixture. In this aspect, the hygroscopic salt should comprise at least about 0.1 weight percent, and preferably, from about 0.3 to about 0.7 weight percent of the deicing composition, based upon the total weight of the deicing composition.

DETAILED DESCRIPTION OF THE INVENTION

The dry, particulate deicer composition of the invention includes dry ground plant material such as dried ground grain, vegetable and/or fruit plant material and particulate deicer salt selected from the group consisting of sodium chloride, magnesium chloride, potassium chloride, calcium chloride and mixtures thereof. Plant material includes the stem, leaves and fruit of the plant, and not extracted materials which are extracted from the plant material. As previously described, in an important aspect, the dry ground plant material is plant material which has been dried and ground and which is selected from the group consisting of dried ground alfalfa, wheat, field and/or lawn grass, linseed, malt, barley, milkweed, clover, vetch, plantain, sorghum, soybeans, cannola seeds, carrots, cotton seed, sunflower seeds, linseed, peanuts, citrus fruits and mixtures thereof. As described above, in most circumstances, the dry, solid, particulate deicing composition comprises at least about 0.5 weight percent dry ground plant material, based upon the weight of the deicing composition, and at least about 80 weight percent particulate deicer salt, based upon the weight of the deicing composition. In general, the deicing composition comprises from about 0.5 to about 50 weight percent dry ground plant material and from about 99 to about 50 weight percent particulate deicer salt, and in an important aspect, from about 0.5 to about 20 weight percent dry ground plant material and from about 99 to about 80 weight percent particulate deicer salt.

The deicer composition which includes the particulate deicer salt and particulate plant material will have a tendency to segregate and not mix well. This will adversely affect the homogeneity of deicer compositions which include sodium chloride and/or potassium chloride. Addition of hygroscopic compositions, such as hygroscopic salts, especially hygroscopic deicer salts in an amount to bind the particulate plant material to the deicer salt and effect substantial homogeneity in the composition are added to the deicer composition. Adding hygroscopic magnesium chloride and/or calcium chloride to the deicer composition will not only pick up water, but avoid segregation, and it also will not adversely affect the ability of the deicer composition to deice because of the ability of magnesium chloride and calcium chloride to deice. As discussed, in this aspect the hygroscopic salt such as magnesium chloride and/or calcium chloride should comprise at least about 0.1 weight percent, and preferably, from about 0.3 to about 0.7 weight percent based upon the total weight of the deicing composition.

EXAMPLE I

Standard alfalfa feed pellets (17% protein) are ground to a size range of about 1500–150 microns. Sodium chloride rock salt is blended with 3% by weight of the ground alfalfa.

The corrosivity of the deicer composition is measured by an alternate immersion corrosion test involving the use of 1"×2" S.A.E. 1010 carbon steel panels which are degreased in hexane and dried after a methanol rinse. The steel panels have a ⅛" diameter hole drilled in the center and near the top of the 1" side. The panels have numbers stamped in each of them. All panels are weighed to the nearest tenth of a milligram after drying. Three percent by dry weight basis of deicer solutions are prepared using the above salt/alfalfa composition in a first solution and plain deicing salt in a second solution. Four panels are suspended in the 3% deicer solutions by threads from a glass rod, such that the panels are completely immersed. During two 1-hour periods each work day, the panels are suspended in air to achieve good contact with oxygen. The other 22 hours of each work day the panels are fully immersed. Over weekends, panels are completely immersed. At the end of each week, old solution is removed and replaced with new solution of the same type. At the end of one month, the panels are removed and the solutions cleaned with 1820 g. hot water, 180 g. of concentrated hydrochloric acid and 2 g. of Rodine 213.

After exposure to the test solutions for 4 weeks, the average corrosion rate in the solution containing the salt/alfalfa composition is found to be 7.3 mils per year, compared to an average corrosion rate of 18.0 mils per year in the solution of plain sodium chloride.

EXAMPLE II

Ice melting capacities of a deicing composition and of plain sodium chloride are compared. A mixture of sodium chloride rock salt with 3% ground alfalfa and 1.75% magnesium chloride solution (containing 30% magnesium chloride by weight) is applied to ice at 15 degrees F., and the volume of ice melted is measured after 60 minutes. This procedure is repeated using plain rock salt.

Plain salt yields 13.8 milliliters of melt (standard deviation=2.8). The salt/alfalfa composition yields 13.2 milliliters of melt (standard deviation=1.6).

What is claimed is:

1. A particulate deicing composition comprising:
   a particulate deicer salt selected from the group consisting of sodium chloride, magnesium chloride, potassium chloride, calcium chloride and mixtures thereof; and
   a particulate plant material having a particle size of from about 2000μ or less and a moisture content of from about 12 percent or less, the particulate deicer salt and the particulate plant material being in relative amounts so that the particulate plant material is effective for inhibiting the corrosivity of the deicer salt on ferrous metal.

2. The particulate deicing composition as recited in claim 1, wherein the deicing composition comprises at least about 50 weight percent deicer salt and at least about 0.5 weight percent particulate plant material.

3. The particulate deicing composition as recited in claims 1 or 2, wherein the particulate plant material is selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof.

4. The particulate deicing composition as recited in claims 1 or 2, wherein the particulate plant material includes alfalfa.

5. The particulate deicing composition as recited in claim 2 where the deicing salt is sodium chloride.

6. The particulate deicing composition as recited in claim 3 where the deicing salt is sodium chloride.

7. The particulate deicing composition as recited in claim 3, wherein the deicing composition further includes a hygroscopic salt in an amount which will bind the particulate plant material to the particulate deicer salt and effect homogeneity of the particulate deicer salt and particulate plant material throughout the deicing composition.

8. The particulate deicing composition as recited in claim 3, wherein the deicing composition includes particulate sodium chloride and the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

9. The particulate deicing composition as recited in claim 4, wherein the deicing composition includes particulate sodium chloride and the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

10. A particulate deicing composition comprising:
    from about 80 to about 99 weight percent particulate sodium chloride; and
    from about 0.5 to about 20 weight percent particulate plant material having a particle size of from about $2000\mu$ to about $150\mu$ and a moisture content of from about 12 weight percent or less, the particulate plant material selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof.

11. The particulate deicing composition as recited in claim 10, wherein the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

12. The particulate deicing composition as recited in claims 10 or 11, where the particulate plant material includes alfalfa.

13. The particulate deicing composition as recited in claim 11, wherein the deicing composition comprises at least about 0.1 weight percent hygroscopic deicer salt.

14. The particulate deicing composition as recited in claim 12, wherein the deicing composition comprises at least about 0.1 weight percent hygroscopic deicer salt.

15. A method for deicing a frozen surface, the method comprising:
    applying a particulate deicing composition to the frozen surface in an amount effective for deicing the frozen surface; the particulate deicing composition comprising a particulate deicer salt selected from the group consisting of sodium chloride, magnesium chloride, potassium chloride, calcium chloride and mixtures thereof; and
    a particulate plant material having a particle size of from about $2000\mu$ or less and a moisture content of from about 12 percent or less, the particulate deicer salt and the particulate plant material being in relative amounts so that the particulate plant material is effective for inhibiting the corrosivity of the deicer salt on ferrous metal.

16. The method for deicing a frozen surface as recited in claim 15, wherein the deicing composition comprises at least about 50 weight percent sodium chloride and at least about 0.5 weight percent particulate plant material.

17. The method for deicing a frozen surface as recited in claims 15 or 16, wherein the particulate plant material is selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof.

18. The method for deicing a frozen surface as recited in claims 15 or 16, wherein the particulate plant material includes alfalfa.

19. The method for deicing a frozen surface as recited in claim 17, wherein the deicing composition comprises at least about 80 weight percent sodium chloride and the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

20. The method for deicing a frozen surface as recited in claim 18, wherein the deicing composition comprises at least about 80 weight percent sodium chloride and the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

21. The method as recited in claim 16, wherein the deicing composition comprises at least about 0.1 weight percent hygroscopic deicer salt.

22. A method for deicing a frozen surface, the method comprising:
    applying a particulate deicing composition to the frozen surface in an amount effective for deicing the frozen surface the deicing composition comprising from about 80 to about 99 weight percent sodium chloride; and
    from about 0.5 to about 20 weight percent particulate plant material having a particle size of from about $2000\mu$ to about $150\mu$ and a moisture content of from about 12 percent or less, the particulate plant material selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof.

23. The method for deicing a frozen surface as recited in claim 22, wherein the deicing composition further includes a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

24. The method for deicing a frozen surface as recited in claim 22 or 23, wherein the particulate plant material includes alfalfa.

25. The method for deicing a frozen surface as recited in claim 23, wherein the deicing composition comprises at least about 0.1 weight percent of the hygroscopic deicer salt.

26. A particulate deicing composition comprising:
   from about 80 to about 99 weight percent, based upon the weight of the deicing composition, of particulate sodium chloride; and
   from about 0.5 to about 20 weight percent, based upon the weight of the deicing composition, of a particulate plant material having a particle size of from about $2000\mu$ to about $150\mu$ and a moisture content of from about 12 weight percent or less, the particulate plant material selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof; and
   at least about 0.1 weight percent, based upon the weight of the deicing composition, of a hygroscopic deicer salt selected from the group consisting of magnesium chloride, calcium chloride and mixtures thereof, the hygroscopic deicer salt being in an amount which will bind the particulate plant material to the particulate sodium chloride and effect homogeneity of the particulate sodium chloride and particulate plant material throughout the deicing composition.

27. A particulate deicing composition comprising:
   a particulate deicer salt selected from the group consisting of sodium chloride, magnesium chloride, potassium chloride, calcium chloride and mixtures thereof; and
   a particulate plant material selected from the group consisting of alfalfa, wheat, grass, linseed, malt, barley, milkweed, clover, vetch, plantain, sorghum, soybeans, canola seeds, carrots, cotton seeds, sunflower seeds, peanuts, citrus fruit and mixtures thereof, the particulate plant material having a particle size of from about $2000\mu$ or less and a moisture content of from about 12 percent or less, the particulate deicer salt and the particulate plant material being in relative amounts so that the particulate plant material is effective for inhibiting the corrosivity of the deicer salt on ferrous metal.

28. The particulate deicing composition as recited in claim 27, wherein the deicing composition further includes a hygroscopic salt which has a hydration which will permit it to gather moisture, the hygroscopic salt in an amount which will bind the particulate plant material to the particulate deicer salt and effect homogeneity of the particulate deicer salt and particulate plant material throughout the deicing composition.

* * * * *